United States Patent [19]

Kinsey

[11] 4,166,594
[45] Sep. 4, 1979

[54] VARIABLE DRIVE CLUTCH FOR FISHING REEL

[75] Inventor: John O. Kinsey, Fayetteville, Ark.

[73] Assignee: Shakespeare of Arkansas, Inc., Fayetteville, Ark.

[21] Appl. No.: 659,332

[22] Filed: Feb. 19, 1976

[51] Int. Cl.² .............................................. A01K 89/02
[52] U.S. Cl. .................................... 242/214; 242/220
[58] Field of Search ............... 242/212, 213, 214, 217, 242/218, 219, 220

[56] References Cited

U.S. PATENT DOCUMENTS

| | | | |
|---|---|---|---|
| 850,580 | 4/1907 | Holzmann | 242/213 |
| 1,445,525 | 2/1923 | McKimmy | 242/214 |
| 1,836,755 | 12/1931 | Hirsch | 242/213 |
| 2,613,883 | 10/1952 | Limpright | 242/220 |
| 3,139,241 | 6/1964 | Johnson | 242/214 |
| 3,910,528 | 10/1975 | Copeland | 242/220 |

Primary Examiner—Billy S. Taylor
Attorney, Agent, or Firm—Hamilton, Renner & Kenner

[57] ABSTRACT

A fishing reel clutch having a drive gear journaled on a manually rotatable drive shaft, and a drive pawl supported on the shaft and held in driving engagement with the drive gear when the shaft is rotated in one direction to reel in the line. The drive pawl is released from driving engagement by a slight reverse rotation of the shaft, whereupon reverse rotation of the gear by a pull on the line is resisted only by variable friction tension applied to the gear.

1 Claim, 6 Drawing Figures

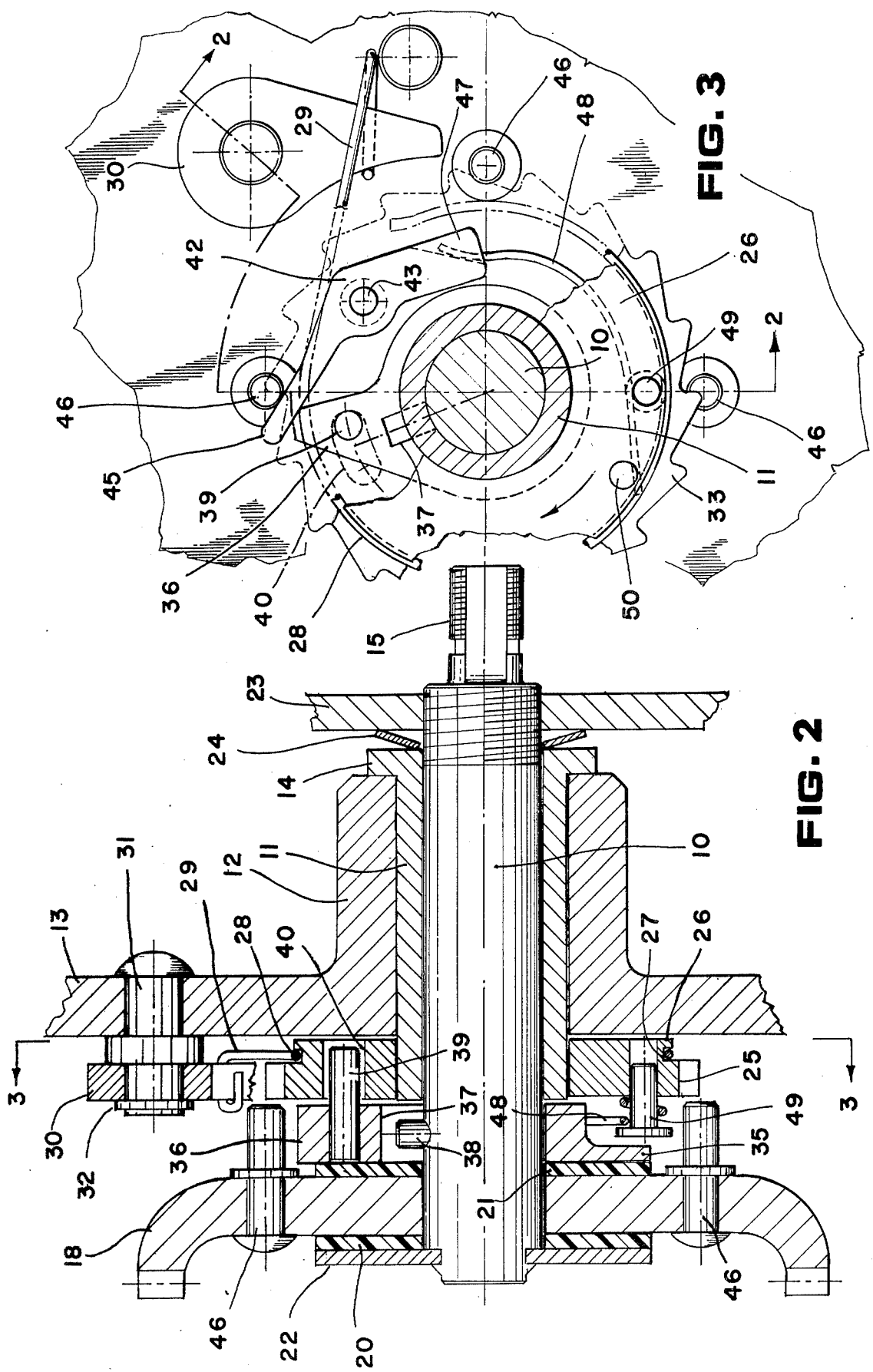

VARIABLE DRIVE CLUTCH FOR FISHING REEL

BACKGROUND OF THE INVENTION

Prior art fishing reels of which I am aware have various forms of clutch controls for reeling in the line and selectively allowing it to pay out in response to a pull on the line subject to a variable amount of drag or frictional resistance. One form of prior clutch control embodies inner and outer crankshafts, the outer one to control the drive gear and the inner one to control drag. A drive disk on the outer shaft has a drive pawl to engage the drive gear for reeling in the line, and an anti-reverse disk is rotatable on the outer shaft as controlled by a peripheral torsion spring and is adapted when the drive gear is reversely rotated to disengage the drive pawl. This construction is dependent upon the somewhat uncertain action of the torsion spring and the drag adjustment is imprecise and unfamiliar to the average fisherman.

SUMMARY OF THE INVENTION

It is an object of the present invention to provide an improved variable drag drive clutch for a fishing reel which is simple and inexpensive to manufacure, and reliable and easy to operate.

Another object is to provide an improved fishing reel clutch which employs a conventional star wheel adjustable drag for convenient and precise brake control.

A further object is to provide a durable clutch construction having a minimum number of parts.

A still further object is to provide an improved clutch construction which has a positive drive for the line spool when rotated in one direction and which disengages the positive drive by an initial reverse rotation of the crank handle and provides variable frictional resistance to reverse rotation of the line spool.

These and other objects are accomplished by the improvements comprising the present invention, a preferred embodiment of which is shown by way of example in the accompanying drawings and described in detail in the following specification. Various modifications and changes in details of construction are included within the scope of the appended claims.

BRIEF DESCRIPTION OF THE DRAWINGS

FIG. 2 is a sectional view of the assembled reel as on line 2—2 of FIG. 3.

FIG. 3 is a cross sectional view as on line 3—3 of FIG. 2, partly broken away, showing the drive pawl held in positive engagement with the drive gear.

DESCRIPTION OF A PREFERRED EMBODIMENT

Figure 1:
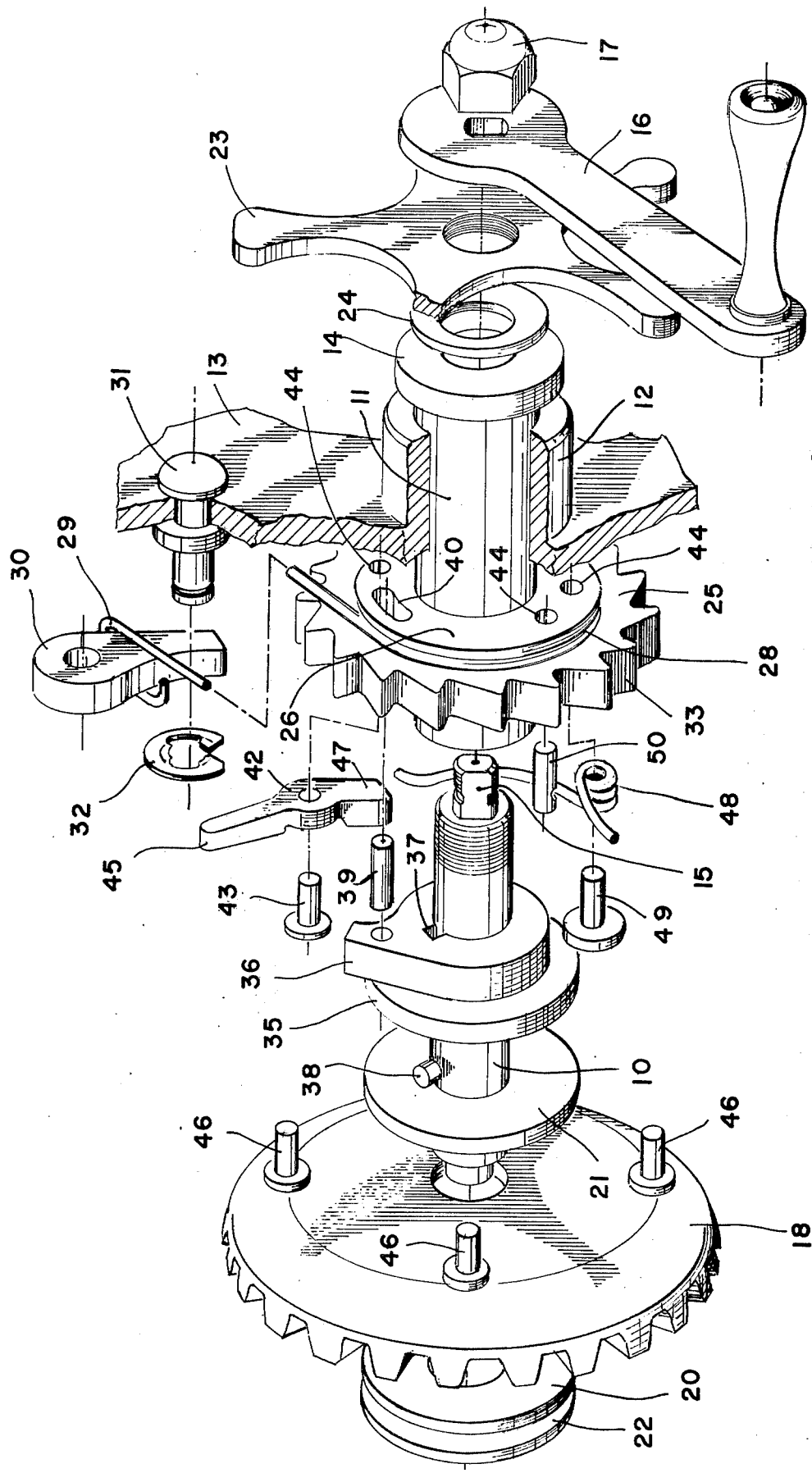
FIG. 1 is an exploded perspective view of the improved variable drive clutch as mounted on the housing of a fishing reel.

Referring first to FIGS. 1 and 2, the improved variable drive clutch is mounted on the drive shaft 10 which is journaled in a bearing sleeve 11 mounted in a cylindrical boss 12 on the reel housing 13 and having an annular flange 14 at its outer end. The outer end of the drive shaft 10 projects beyond the sleeve 11 and is provided with a reduced flatted end portion 15 on which a crank handle 16 is keyed, said flatted portion being threaded to receive a nut 17 to secure the handle on said flatted portion.

The inner end of the drive shaft 10 has a driving gear 18 journaled thereon, said gear being operatively connected in a usual manner to the spooling member (not shown) of the reel. Friction drag washers 20 and 21 encircle the drive shaft 10 in abutment with opposite faces of driving gear 18, the inner washer 20 being interposed between the gear face and a retaining washer 22 on the inner end of the shaft. The outer end portion of the shaft adjacent to the reduced end 15 has a conventional star wheel 23 screwed thereon, and a dished tension washer 24 is interposed between the star wheel and the flange 14 of sleeve 11. Rotation of the star wheel varies the amount of tension or drag applied to the driving gear 18 by the drag washers 20 and 21.

The inner end of bearing sleeve 11 extends inwardly beyond the inner face of reel housing 13, and a non-reverse ratchet wheel 25 is journaled on said inner extension contiguous to said housing inner face. The ratchet wheel has a raised circular disk portion 26 on its outer face and an annular peripheral groove 27 is formed therein. A circular spring 28 is engaged in said groove and has a looped end 29 projecting tangentially therefrom and engirdling the arm of a ratchet pawl 30 secured rotatably on a pivot pin 31 in the reel housing by a C-clip washer 32. The pawl 30 is adapted to engage the ratchet teeth 33 of the wheel 25 when the drive gear is reversely rotated by the pull of a fish on the spooling member, in a manner to be described.

An interposer member having a disk portion 35 and a drive arm 36 is keyed on the drive shaft 10 between the ratchet wheel 25 and drag washer 21. The interposer member preferably has a keyway 37 into which a pin 38 on the shaft 10 projects, thus non-rotatably securing the interposer on the shaft. The drive arm 36 is connected to the ratchet wheel for limited rotation relative thereto by a pin 39 in the drive arm extending into a circumferential slot 40 in the ratchet wheel. The disk portion 35 abuts drag washer 21.

Figure 6:
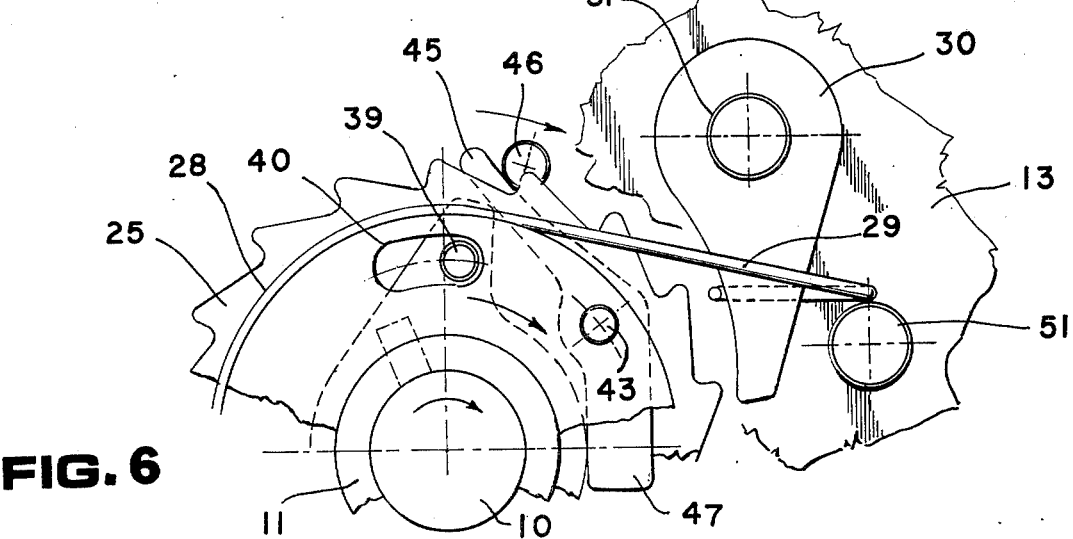
FIG. 6 is a partial view similar to FIG. 3, showing the positive drive engaged after clockwise rotation has started.

The drive arm 36 is adapted to engage a drive pawl 42 pivoted on the ratchet wheel 25 by a pin 43 secured in a hole 44 therein adjacent to the slot 40. When the shaft 10 is rotated clockwise as viewed in FIG. 3, the drive arm 36 forces the outer end 45 of pawl 42 radially outward into engagement with one of the drive pins 46 secured in drive gear 18 and extending outwardly therefrom. Continued rotation will rotate the gear 18 to reel in the line. The inner end 47 of drive pawl 42 is yieldingly urged against the circular hub of drive arm 36 by a light arcuate spring 48 secured in the ratchet wheel 25 by a pin 49 and tensioned by a pin 50 bearing against the adjacent end of the spring to press the opposite end thereof in a radially inward direction against the inner end 47 of drive pawl 42. During this clockwise rotation the pin 39 is at the right end of slot 40, as viewed in FIGS. 3 and 6, and will drive the ratchet wheel clockwise.

The initial clockwise rotation of the ratchet wheel 25 moves the looped end 29 of spring 28 tangentially to the right and moves the ratchet pawl 30 radially out of engagement with the ratchet wheel 25, to the position shown in FIG. 3, wherein the outer end of loop 29 engages a pin 51 secured in the housing 13. As the ratchet wheel continues to rotate clockwise the circular spring 28 will be held against rotation by pin 51 and will slip in the groove 27 in the disk portion 26 of the interposer.

Figure 4:
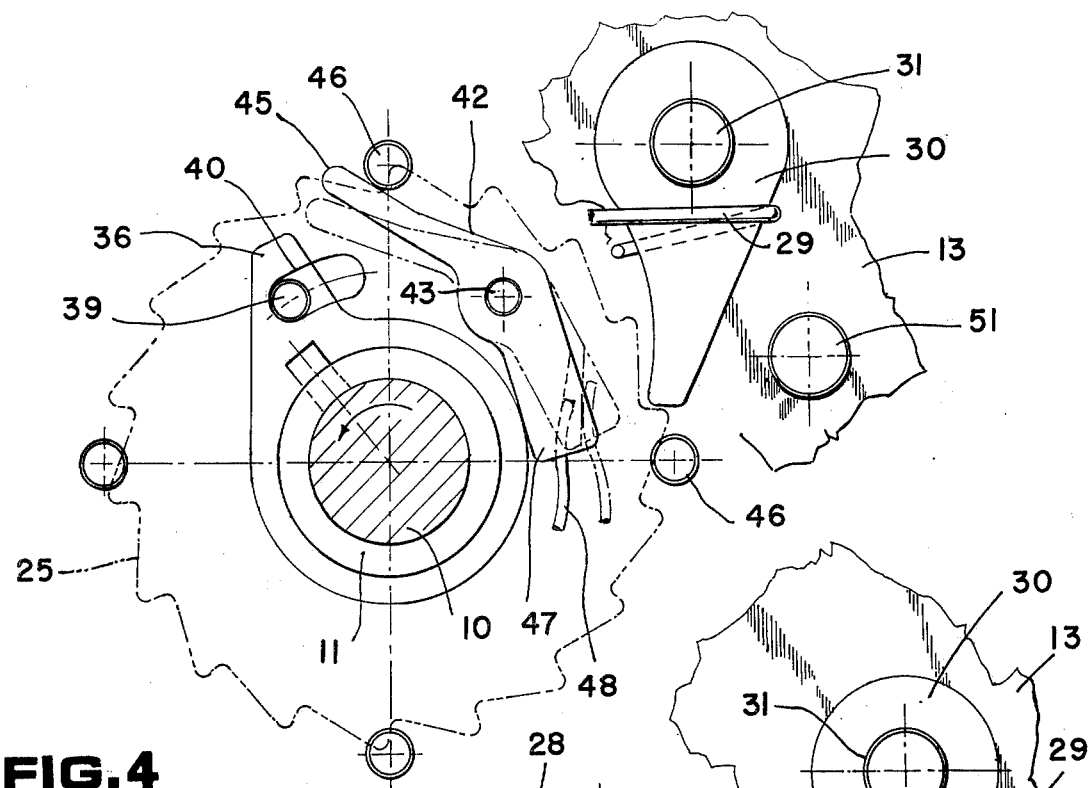
FIG. 4 is a fragmentary view similar to FIG. 3, showing the positive drive disengaged to allow reverse rotation of the drive gear.
Figure 5:
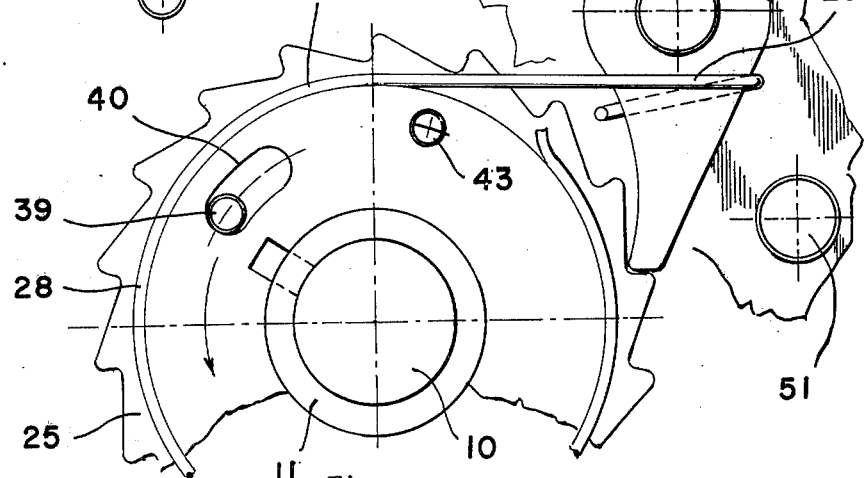
FIG. 5 is a cross-sectional view similar to FIG. 3, showing the ratchet pawl engaged with the ratchet wheel to prevent reverse rotation thereof.

In order to disengage the drive gear to allow it to rotate subject to the friction exerted by the drag washers 20 and 21, for playing a fish on the line, the shaft 10 is rotated by the crank handle in a counterclockwise direction, thereby moving the drive pin 39 to the other end of slot 40, as seen in FIG. 4. This movement releases the drive arm 36 from engagement with the outer end 45 of the drive pawl, but the spring 48 still holds it yieldingly outward in position to engage pins 46. A slight amount of further counterclockwise rotation of the shaft 10 will rotate the ratchet wheel and encircling spring 28 to pull the ratchet pawl 30 radially inward into engagement with one of the teeth on the ratchet wheel 25, as seen in FIG. 5. Now the ratchet wheel and the shaft 10 are held against further counterclockwise rotation and the drive gear will turn on the shaft when the pull of a fish on the line overcomes the resistance of the drag washers. The amount of resistance is quickly and easily varied by rotating the star wheel 23 in the customary manner.

As the drive gear rotates counterclockwise, the drive pins 46 will slip or ratchet over the drive pawl 42 against the radially outward yielding pressure exerted thereon by the spring 48, as indicated in phantom lines in FIG. 4.

The improved variable drag drive clutch is simple and inexpensive to manufacture, easy to operate, has a positive drive in one direction and free spooling in the reverse direction subject to a drag resistance quickly adjusted by a conventional star wheel.

I claim:

1. A variable drive clutch for a fishing reel having a crank shaft and a drive gear having axially extending exterior drive pins and journaled on said shaft, a non-reverse ratchet wheel journaled on said shaft, a ratchet pawl engaging said ratchet wheel to permit rotation thereof in one direction and to limit reverse rotation, a drive pawl pivoted intermediate its ends on said ratchet wheel for engaging said drive gear drive pins, a drive arm having a hub secured to said shaft, and adapted to hold said drive pawl in positive driving engagement with said drive gear when the shaft is rotated in one direction, a pin on said arm and a slot in said ratchet wheel movably receiving said pin for permitting limited rotation of said arm relative to said ratchet wheel between positions engaging and disengaging the drive arm and the drive pawl, and a spring encircling the ratchet wheel holding the ratchet pawl in engagement with the ratchet wheel when the wheel is rotated in a reverse direction and releasing said ratchet pawl when the ratchet wheel is rotated in the opposite direction, means applying variable frictional resistance to rotation of said drive gear, spring means on the ratchet wheel engaging the inner end of said drive pawl for biasing its outer end into engagement with said drive gear drive pins, said spring means yieldingly permitting reverse rotation of said drive gear, and said hub on the drive arm adapted to abut the inner end of said drive pawl for limiting the biased movement of the outer end of said drive pawl.

* * * * *